3,839,404
PROCESS FOR ADIPONITRILE
Richard V. Norton, Wilmington, Del., assignor to Sun Research and Development Co., St. Davids, Pa.
No Drawing. Filed Mar. 9, 1973, Ser. No. 339,800
Int. Cl. C07c 121/10
U.S. Cl. 260—465.2      5 Claims

ABSTRACT OF THE DISCLOSURE

A process for the preparation of adiponitrile which comprises feeding an aqueous slurry or solution of diammonium adipate at hydrolysis equilibrium concentrations to a dehydration catalyst in a fixed or fluidized bed and at a temperature of from about 300° C. to about 500° C.

---

It is known in the art to prepare adiponitrile by a variety of methods, including the catalytic dehydration of mixtures of adipic acid and ammonia. U.S. Pat. 3,360,541, for example, discloses a typical vapor phase process wherein vapors of adipic acid and ammonia are passed over the dehydration catalyst at 333° C. to yield a mixture of adiponitrile and water which is subsequently condensed, allowed to form an aqueous and oily layer and product adiponitrile isolated from the oily layer in yields of from about 85% to 91% of theoretical. This patent disclosure also points out that the catalytic dehydration of mixtures of adipic acid and ammonia to yield adiponitrile may be regarded as the successive elimination of four molecules of water from adipate where "adiponitrile precursors" are formed in an equilibrium mixture, said "precursors" being ammonium adipamate, adipamide, ammonium cyanovalerate, and cyanovaleramide.

U.S. Pat. 3,629,316 is also of interest in that it discloses a liquid phase system wherein a prereaction of molten adipic acid and ammonia is made to form adipamide and some other intermediates, water and ammonia gas, and then this mixture is subjected to a catalytic dehydration to obtain acrylonitrile. In that process, the prereaction is conducted at a temperature of about 320° F. to 420° F. (160° C. to 215° C.) under anhydrous conditions which will avoid attainment of reaction equilibrium or near-equilibrium, the object being to obtain adipamide in highest nonequilibrium amount possible. The actual yield of this process is about 92% based on the adipic acid reacted.

It is further disclosed in U.S. Pat. 2,132,849 that adiponitrile may be made by passing ammonia through a melt consisting of adipic acid, aqueous ammonia and ammonium molybdate, the yields of product being on the order of 45% to about 55% based on the adipic acid used.

It has now been found that an improved process for adiponitrile is achieved by equilibriating an ammoniacal solution or dispersion of diammonium adipate at a temperature of about 200° C. to about 300° C. and thereafter feeding said aqueous equilibrium system to a dehydration catalyst in a fixed or fluidized bed system. In this way yields of adiponitrile exceeding 90% are obtained and it is indeed unexpected that the process of the invention gives effective dehydration and such high yields with so much water present during contact of the dehydration catalyst with the equilibrium mixture.

In accord with the process of the invention, an aqueous solution of diammonium adipate is first heated at about 200° C. to about 300° C. so that equilibrium concentrations of hydrolysis intermediates are attained and then the aqueous solution is fed into the fixed or fluidized bed catalyst system. The concentration of the diammonium adipate in the feed stream will be about 0.5 to about 5 molar, preferably about 2.5 molar and the salt is readily prepared by passing ammonia into an aqueous slurry of the appropriate amount of adipic acid. The amount of ammonia used in this process is relatively low and will range from about 5 to 20 moles (preferably 10 to 15) per mole of adipic acid. Below about 5 moles of ammonia per mole of adipic acid the yield of adiponitrile falls significantly below the 90% to 97% yields obtained by the process of the invention. This aqueous system is heated to the above-described temperatures for a time sufficient to reach at least about 90%, preferably 95%, of equilibrium, which may be determined by paper chromatographic analysis of the hydrolyzate. At the lower temperature, this time will be about 30 minutes while only about 5 minutes or even less is required at the upper end of the temperature range. It will be understood that the aqueous system will be either a solution of the diammonium salt of adipic acid in water or a dispersion depending upon the amount of salt and its solubility at the particular temperature employed. For example, a 2.5 molal system is a slurry at 200° C., but a solution at 300° C., and thus in all but the most concentrated systems the salts are all in solution. The chemical equilibria that occur has been determined by paper chromatography and may be illustrated as follows:

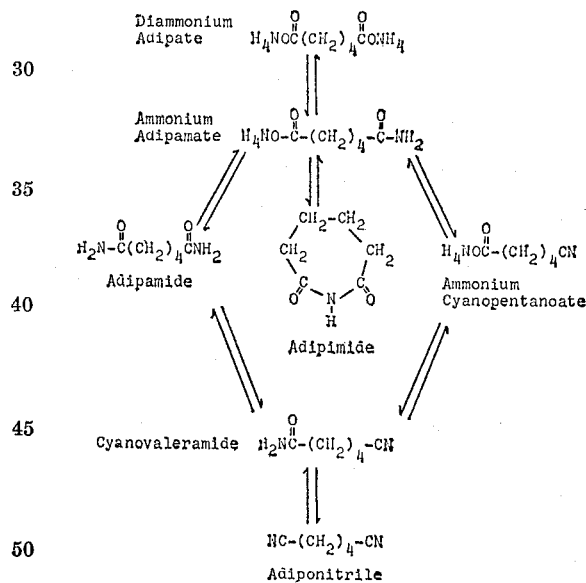

The aqueous system of hydrolysis intermediates of at least 90% of their equilibrium compositions is then fed to a conventional dehydration catalyst at 300–500° C., preferably at 330–380° C., in either a fluid bed or a fixed bed catalyst reactor. Where a fluidized bed is employed, the vapors generated as the aqueous system enters the hot catalytic reactor serve to keep the catalyst in a fluidized state. Such fluid and fixed bed systems are well known in the art and need not be detailed here. Reference is made, however, to U.S. 3,629,316 which discloses a fixed bed system of the tray type which may be used in the process of the invention.

Any solid dehydration catalyst conventionally used by the prior art is operable in this process. For instance, silica gel, alumina, solid phosphoric acid and the like can be used. Likewise, the particle size of the catalyst is not critical and is dictated by the engineering geometry employed. The dehydration reaction may be run at subatmospheric pressure or under slight pressure. It is advantageous for better heat economy to use highly concentrated hydrolyzate solutions, e.g., 0.5 to 5 molal, about 2.5 molal being preferred.

In a preferred technique, the equilibrium solution will be simply passed through a column containing the dehydration catalyst at 330° C. to 380° C. and the effluent condensed, led to a settling tank and crude adiponitrile removed from the upper portion of the two layer system which forms. The aqueous lower layer containing unconverted intermediates and ammonia may be recycled, but such recycle must be to or just prior to the equilibration reaction since only an equilibrium mixture should be introduced to the dehydration catalyst system.

In order to further illustrate the invention, the following examples are given:

GENERAL PROCEDURE

To 1 liter of water in a heated holding tank 1 mole of adipic acid and the appropriate amount of ammonia is added to give the desired concentration. This solution is then equilibrated at the desired conditions and then passed by use of nitrogen pressure at 0.15 ml. per minute directly into a fluidized bed at 380° C. containing 50 to 500 micron particles of silica gel treated with $P_2O_5$ and then fluidized by the vapors formed from the feed stream. The effluent was collected in an ice trap and the layers which formed analyzed by vapor phase chromatography. The results are shown in the following table, the yields being based on the adipic acid fed to the reactor:

TABLE I.—FORMATION OF ADIPONITRILE

| Example number: | Mole ratio, NH$_3$/adipic acid | Molarity of adipic acid | Equilibrium Temp. (° C.) | Equilibrium Time (min.) | Hours on stream | Adiponitrile yield, percent |
|---|---|---|---|---|---|---|
| 1 | 15:1 | 2.5 | Not equilibriated | | 2 | 77 |
| 2 | 5:1 | 2.5 | 300 | 60 | 2 | 87 |
| 3 | 15:1 | 2.5 | 250 | 120 | 2 | 96 |
| 4 | 15:1 | 1.0 | 300 | 60 | 2 | 91 |
| 5 | 10:1 | 2.5 | 300 | 60 | 1 | 96 |
|   |      |     |     |    | 2 | 96 |
|   |      |     |     |    | 3 | 95 |
|   |      |     |     |    | 10 | 93 |
|   |      |     |     |    | 30 | 93 |
| 6 | 5:1 | 1.0 | 300 | 60 | 2 | 85 |
| 7 | 20:1 | 2.8 | 300 | 60 | 2 | 97 |
| 8 | 10:1 | 2.5 | Not equilibriated | | 2 | 75 |

It is clear from the results shown in the above table that equilibration and a mole ratio of NH$_3$ to adipic acid greater than 5:1 (preferably 10:1) are needed to obtain high yields of adiponitrile product. The data also shows that the time on stream is not critical to high yield. It is clear from these data that the process makes a valuable contribution to the art and significantly reduces the amount of ammonia required to make adiponitrile from adipic acid.

The invention claimed is:

1. A process for the preparation of adiponitrile which comprises heating an aqueous solution or dispersion of diammonium adipate containing at least about 5 moles of ammonia per mole of adipic acid at a temperature between about 200° C. and about 300° C. to obtain equilibrium concentrations of hydrolysis intermediates, feeding said aqueous equilibrium hydrolysis products to a dehydration catalyst in a fixed or fluidized bed at a temperature between about 330° C. and 380° C., and separating adiponitrile from the catalyst bed effluent.

2. A process for the preparation of adiponitrile which comprises heating an aqueous solution or dispersion of diammonium adipate containing from about 5 to about 15 moles of ammonia per mole of adipic acid at a temperature between about 200° and about 300° C. for a time sufficient to hydrolyze said diammonium adipate to at least about 90% of its equilibrium hydrolysis products, feeding said aqueous equilibrium products to a dehydration catalyst in a fixed or fluidized bed at a temperature between about 330° C. and 380° C., and separating adiponitrile from the catalyst bed effluent.

3. The process of Claim 2 where the catalyst bed effluent containing unconverted intermediates and ammonia is recycled to the aqueous equilibration system.

4. The process of Claim 2 where the dehydration catalyst is silica gel.

5. The process of Claim 2 where the dehydration catalyst is silica gel treated with phosphoric acid.

References Cited

UNITED STATES PATENTS 3,454,619   7/1969   Hayes _____ 260—465.2
3,481,969   12/1969  Corsepius et al. _____ 260—465.2

JOSEPH PAUL BRUST, Primary Examiner